United States Patent
Hamburg et al.

(10) Patent No.: US 11,956,345 B2
(45) Date of Patent: Apr. 9, 2024

(54) DPA-RESISTANT KEY DERIVATION FUNCTION

(71) Applicant: CRYPTOGRAPHY RESEARCH, INC., San Jose, CA (US)

(72) Inventors: Michael Alexander Hamburg, San Francisco, CA (US); Denis Alexandrovich Pochuev, Lafayette, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 145 days.

(21) Appl. No.: 17/606,434

(22) PCT Filed: Apr. 30, 2020

(86) PCT No.: PCT/US2020/030845
§ 371 (c)(1),
(2) Date: Oct. 25, 2021

(87) PCT Pub. No.: WO2020/227029
PCT Pub. Date: Nov. 12, 2020

(65) Prior Publication Data
US 2022/0182216 A1   Jun. 9, 2022

Related U.S. Application Data

(60) Provisional application No. 62/985,686, filed on Mar. 5, 2020, provisional application No. 62/844,077, filed on May 6, 2019.

(51) Int. Cl.
*H04L 29/06* (2006.01)
*G06F 21/00* (2013.01)
(Continued)

(52) U.S. Cl.
CPC ............ *H04L 9/003* (2013.01); *H04L 9/0869* (2013.01)

(58) Field of Classification Search
None
See application file for complete search history.

(56) References Cited

U.S. PATENT DOCUMENTS

| 2009/0172398 A1* | 7/2009 | Falk | H04L 63/062 |
| | | | 713/168 |
| 2012/0072737 A1* | 3/2012 | Schrijen | G06F 7/588 |
| | | | 713/189 |

(Continued)

OTHER PUBLICATIONS

Notification of Transmittal of the International Search report and the Written Opinion of the International Searching Authority, or the Declaration dated Jul. 21, 2020 re: Int'l Appln. No. PCT/US20/030845. 14 pages.

*Primary Examiner* — Lisa C Lewis
(74) *Attorney, Agent, or Firm* — Lowenstein Sandler LLP (57) ABSTRACT

Aspects of the present disclosure involve a method and a system to support execution of the method to obtain a first N cryptographic key, receive a key diversification information comprising a first plurality of bits, obtain an expanded key diversification information (EKDI) comprising a second plurality of bits, wherein a number of bits in the second plurality of bits is greater than a number of bits in the first plurality of bits, and wherein a value of each bit of the second plurality of bits is deterministically obtained in view of values of the first plurality of bits, and apply, by the processing device, a key derivation function to the first cryptographic key and the EKDI to obtain a second cryptographic key.

25 Claims, 7 Drawing Sheets

(51) Int. Cl.
*H04L 9/00* (2022.01)
*H04L 9/08* (2006.01)

(56) References Cited

U.S. PATENT DOCUMENTS

2016/0173364 A1\* 6/2016 Pitio .......................... G06F 9/50
                                                                        709/226
2020/0336303 A1\* 10/2020 Sierra ................... H04W 12/12

\* cited by examiner

DPA-RESISTANT KEY DERIVATION FUNCTION

TECHNICAL FIELD

The disclosure pertains to cryptographic computing applications, more specifically to protection of cryptographic operations, such as generation of cryptographic keys, from side-channel attacks.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to protection against side-channel attacks of cryptographic computations that involve derivation of secret keys by using expanded diversification information to increase homogeneity of input values during various steps of key derivation.

Cryptographic applications employ a variety of schemes and algorithms to protect data using secret keys. To protect privacy of data, new secret keys are often generated. Such keys may be specific to applications and their intended uses. To facilitate data transfers and encryption/decryption, the same secret keys may need to be repeatedly but secretly generated by some deterministic key generation algorithms. Such secret key generation may nonetheless be vulnerable to side-channel attacks. A side-channel attack may be performed by monitoring emanations (signals) produced by electronic circuits of the target's (victim's) computer. Such signals may be acoustic, electric, magnetic, optical, thermal, and so on. By recording emanations, a hardware trojan and/or malicious software may be capable of correlating specific processor (and/or memory) activity with operations carried out by the processor. A simple power analysis (SPA) side-channel attack may involve examination of the electric power used by the device as a function of time. As the presence of noise masks the signal of the processor, a more sophisticated differential power analysis (DPA) attacks may involve undertaking statistical analysis of power measurements performed over multiple cryptographic operations (or multiple iterations of a single cryptographic operation). An attacker employing DPA may be capable of filtering out the noise component of the power signal (using the fact that the noise components may be uncorrelated between different operations or iterations) to extract the component of the signal that is representative of the actual processor operations, and to infer the value of the private key from this signal.

As a result, even if new private keys are generated periodically (or at random times)—for example by using a key derivation function to derive a new key from a previous key or from some initial base key—this may nonetheless provide little protection against a DPA attack, if the attacker intercepts the new key during its derivation. A typical key derivation function, e.g. a hash-based key derivation function (HKDF), deploys one or more hashes (hash functions) which involve outputting fixed-length digests based on variable-length messages, where the messages may include the initial (base) key and a variety of auxiliary data (salt, diversification information, padding, etc.). The hashes, or hash functions, e.g. hash-based message authentication codes (HMACs), may be linked together so that consecutive hashes use an output of the previous hash as well as some auxiliary information. For example, a "salt" may be used as input into a first instance of the hash function whereas "diversification information" may be used as an input into a second instance of the hash function. Salt may be a secret or a non-secret string of data, in some implementations. Salt may be a randomly generated string (although salt may be reused for derivation of one or more subsequent keys) or a string derived from public information upon some predetermined convention. Diversifying information (sometimes simply referred to as "Info" throughout this disclosure) may include context and information about a specific application that is to use the key being generated.

A DPA attacker may be capable of observing the power consumed (or electromagnetic field produced) by the processor and/or the memory across multiple instances of execution of the key derivation function with the same initial key and various Info (or salt) strings as inputs. Having collected emanations for a variety of Info inputs and the same initial key, a DPA attacker can construct a number of hypotheses about the initial key (and, possibly, some intermediate or final output keys generated by key derivation function) and can test these hypotheses using methods of statistical analysis. A hypothesis can be about a value of a specific string within the initial key or within one of the derivatives of the key (e.g., the final output key). Based on the analysis of statistical correlations, the DPA attack may succeed in determining at least some part(s) of the keys that are intended to remain secret.

An implementation of a key derivation function may involve a number of successive iterations. An initial key and a block of Info may be input into a compression function to obtain a chaining (iteration) value. The chaining value, together with the next block of Info, may subsequently be processed by the compression function to obtain a new chaining value, and the process may be repeated until all blocks of Info are processed and an output is determined. The output may be a new cryptographic key or some other cryptographic material that may be used to obtain a new key. Successive blocks of Info may be 256 or 512-bit blocks.

When this key generation process is repeated many times with the same initial key but different Info, a DPA attacker may be able to collect enough emanation data to perform a successful statistical analysis and determine the initial key. For example, a 256-bit block of Info may potentially have many (up to $2^{256}$) values. As a result, even if a DPA attacker has an opportunity to observe emanations during processing of the initial key (the first iteration of the compression function) or subsequent chaining values (further iterations) for even a small fraction of those values, the DPA attacker may come in possession of significant correlation data.

Aspects of the present disclosure address this and other shortcomings of the conventional cryptographic key derivation operations by expanding diversification information (and/or salt) in a manner that ensures that each block of the Info has only a limited number of possible values. Limiting variability of input block values ensures much more homogenous potential emanations/power consumption signatures of the processing device that performs key derivation and makes it more difficult for an attacker to collect a sufficient set of statistical data. As an illustrative example, a string of Info (e.g, 010) may be replicated (expanded) multiple times until it takes a size of an entire block (e.g. 010 010 010 010 010 010 010 010). Because expansion of a string of Info into a block is performed in a deterministic way, the expanded block has the same number of possible values as the (much shorter) underlying string. (In the above example, the expanded block may have only $2^3=8$ values despite being 24 bits long). This increased homogeneity of possible inputs into the compression function during various iterations of key derivation increases its protection against DPA attacks.

The disclosed implementations may be used with various key derivation algorithms, such as those that use a single instance of a hash function or multiple instances of a hash function, e.g., as a hash-based message authentication code (HMAC). The disclosed implementations may be used with federally-approved key derivation functions, such as hash-based key derivation function (HKDF) as well as NIST 800-108 counter-mode, feedback-mode, and double-pipeline key derivation functions. In implementations where multiple stages are used with each stage implementing one or more instances of hash functions, later stages may use, as inputs, outputs of the prior stages. In such implementations, to achieve adequate protection of the output, it may be sufficient to implement block expansion during only one of the stages. In some implementations, more than one stage may be protected by the block expansion.

Figure 1:
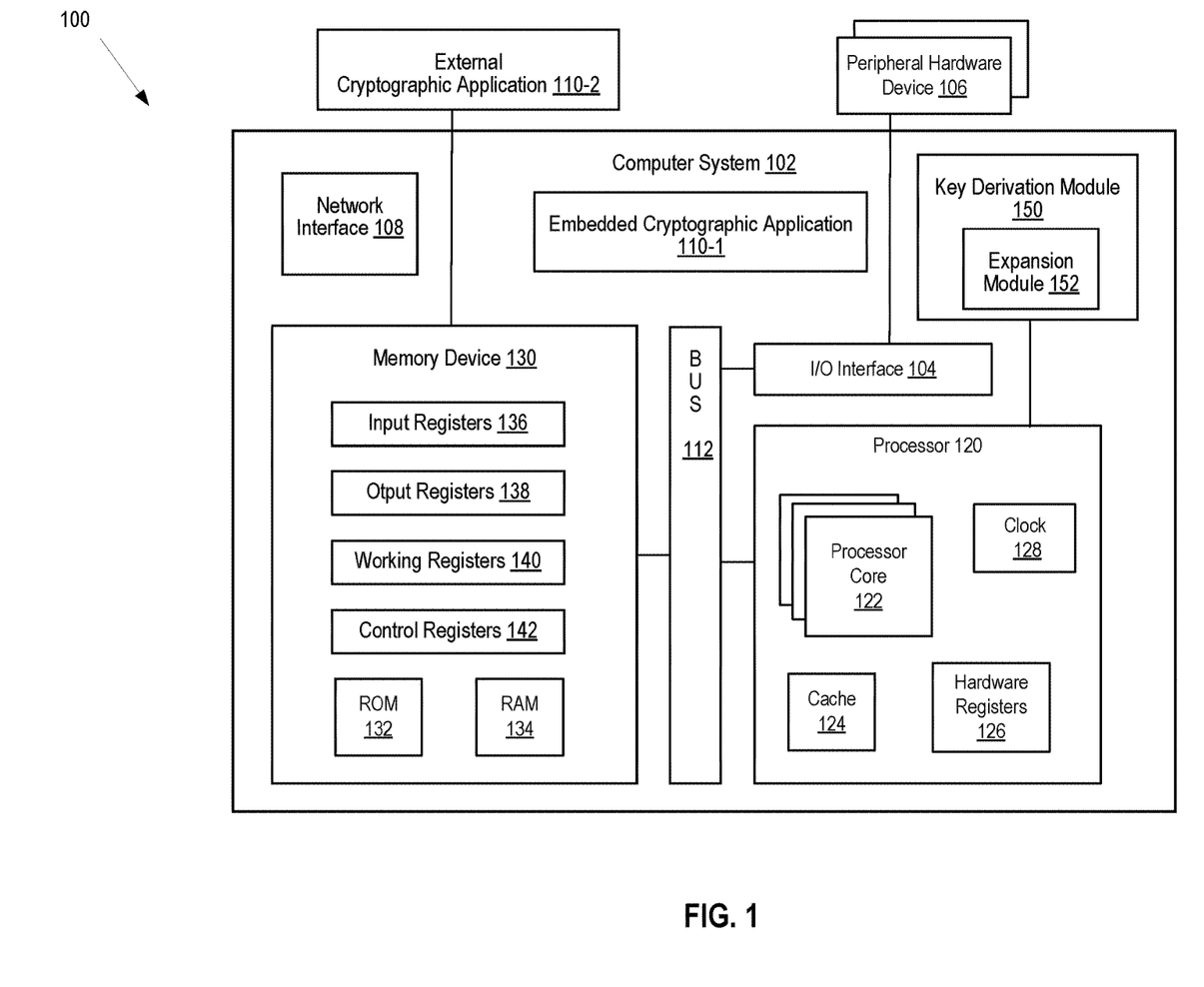
FIG. 1 is a block diagram illustrating an example system architecture in which implementations of the present disclosure may operate.

FIG. 1 is a block diagram illustrating an example system architecture 100 in which implementations of the present disclosure may operate. The example system architecture 100 may be a desktop computer, a tablet, a smartphone, a server (local or remote), a thin/lean client, and the like. The example system architecture 100 may be a smart a card reader, a wireless sensor node, an embedded system dedicated to one or more specific applications (e.g., cryptographic applications 110), and so on. The system architecture 100 may include, but not be limited to, a computer system 102 having one or more processors 120 (e.g., central processing units (CPUs)) capable of executing binary instructions, and one or more memory devices 130. "Processor" refers to a device capable of executing instructions encoding arithmetic, logical, or I/O operations. In one illustrative example, a processor may follow Von Neumann architectural model and may include an arithmetic logic unit (ALU), a control unit, and a plurality of registers.

The system architecture 100 may further include an input/output (I/O) interface 104 to facilitate connection of the computer system 102 to peripheral hardware devices 106 such as card readers, terminals, printers, scanners, internet-of-things devices, and the like. The system architecture 100 may further include an internet interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from the computer system 102. Various hardware components of the computer system 102 may be connected via a bus 112 which may have its own logic circuits, e.g., a bus interface logic unit.

The computer system 102 may support one or more cryptographic applications 110, such as an embedded cryptographic application 110-1 and/or external cryptographic application 110-2. The cryptographic applications 110 may be secure authentication applications, encrypting applications, decrypting applications, secure storage applications, and so on. The external cryptographic application 110-2 may be instantiated on the same computer system 102, e.g., by an operating system executed by the processor 120 and residing in the memory device 130. Alternatively, the external cryptographic application 110-2 may be instantiated by a guest operating system supported by a virtual machine monitor (hypervisor) executed by the processor 120. In some implementations, the external cryptographic application 110-2 may reside on a remote access client device or a remote server (not shown), with the computer system 102 providing cryptographic support for the client device and/or the remote server.

The processor 120 may include one or more processor cores 122 having access to cache 124 (single or multi-level cache) and one or more hardware registers 126. In implementations, each processor core 122 may execute instructions to run a number of hardware threads, also known as logical processors. Various logical processors (or processor cores) may be assigned to one or more cryptographic applications 110, although more than one processor may be assigned to a single cryptographic application for parallel processing. A multi-core processor 120 may simultaneously execute multiple instructions. A single core processor 120 may typically execute one instruction at a time (or process a single pipeline of instructions). A processor 120 may be implemented as a single integrated circuit, two or more integrated circuits, or may be a component of a multi-chip module.

The memory device 130 may refer to a volatile or non-volatile memory and may include a read-only memory (ROM) 132, a random-access memory (RAM) 134, as well as (not shown) electrically erasable programmable read-only memory (EEPROM), flash memory, flip-flop memory, or any other device capable of storing data. The RAM 134 may be a dynamic random access memory (DRAM), synchronous DRAM (SDRAM), a static memory, such as static random access memory (SRAM), and the like.

The memory device 130 may include one or more registers, such as one or more input registers 136 to store initial key material, salt, diversifying info, length, and the like, one or more output registers 138 to store output keys, intermediate keys, hash values, and the like, and one or more working registers 140 to store inputs (messages) into hash functions, chaining values of successive iterations of the hash functions, and the like. The memory device 130 may further include one or more control registers 142 for storing information about modes of operation, selecting a proper hash function (e.g., SHA-256 or SHA-512), initializing operations of the hashing process, choosing correct block sizes of messages for the selected hash function, tracking a status of the hashing process. The control registers 142 may communicate with one or more processor cores 122 and a clock 128, which may perform iteration/block counting. The registers 136-142 may be implemented as part of the RAM 134. In some implementations, some or all of the registers 136-142 may be implemented separately from the RAM 134. Some or all of the registers 136-142 may be implemented as part of the processor 120 (e.g., as part of the hardware registers 126). In some implementations, the processor 120 and the memory device 130 may be implemented as a single field-programmable gate array (FPGA).

The computer system 102 may include a key derivation module 150 to provide instructions to the processor 120 to perform DPA-resistant key derivation operations, in accordance with implementations of the present disclosure. The key derivation module 150 may be implemented in software, in hardware (e.g., as part of the processor 120), in firmware, or in any combination thereof. The key derivation module 150 may include an expansion module 152 to control expansion of diversification information. In some implementations, the key derivation module 150 may access the contents of the registers 136-142 functions to retrieve and store data used and generated during key derivation operations.

Figure 2A:
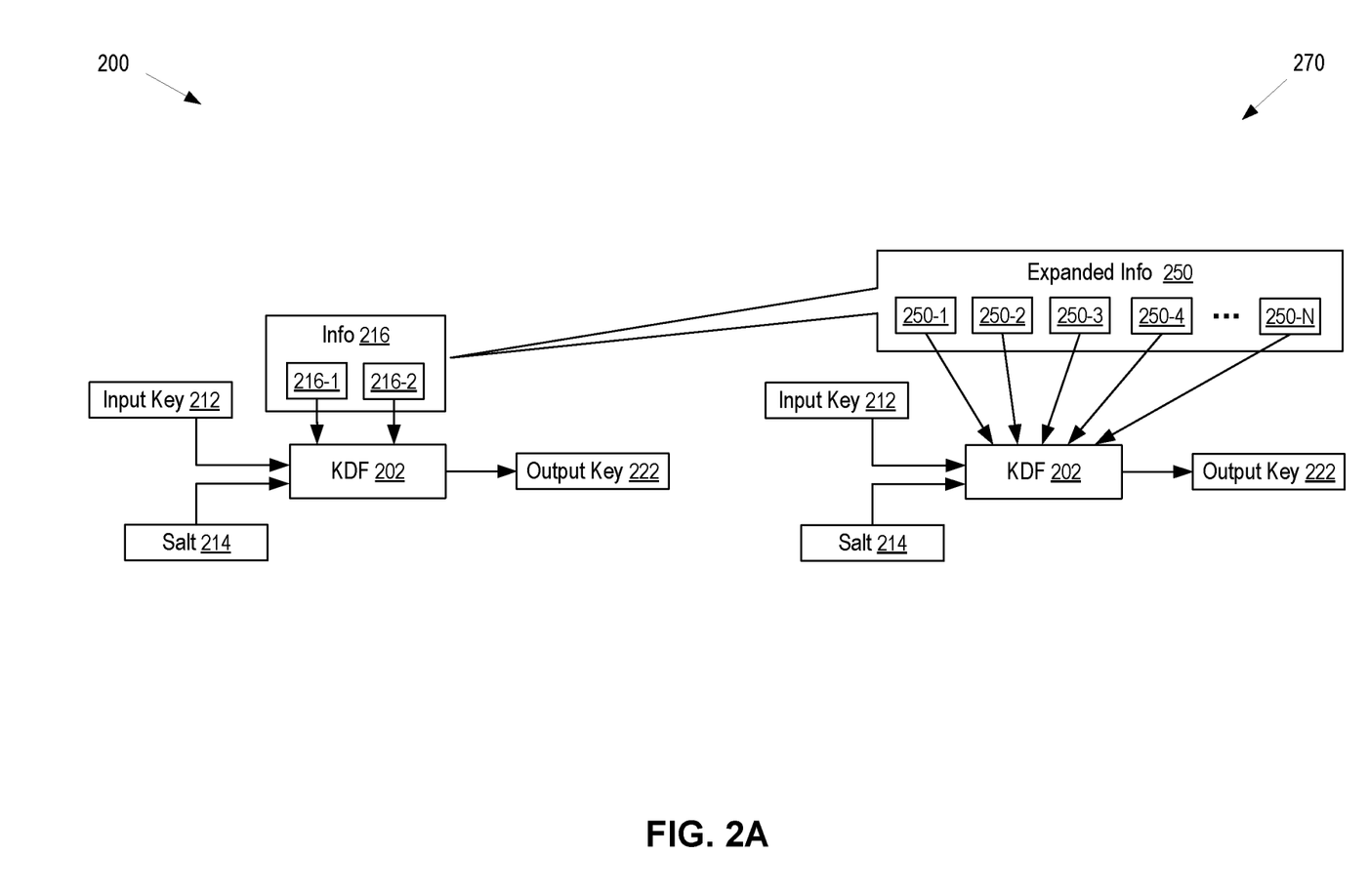
FIG. 2A is an exemplary illustration of a key derivation operation that uses expanded diversification information in accordance with one or more aspects of the present disclosure.

FIG. 2A is an exemplary illustration of a key derivation operation 200 that uses expanded diversification information in accordance with one or more aspects of the present disclosure. The exemplary operation 200 may be performed by one or more computer systems 102, in some implementations. The key derivation function (KDF) 202 may be a hash-based derivation function that may include one or more instances of a hash algorithm. Each instance of a hash algorithm may include multiple applications of a chaining function to a chaining value and an external input. At various stages of the hash computation, the external input into KDF 202 may include blocks (e.g., 256-bit, 512-bit or 1024-bit blocks) of an input key 212, salt 214 (optional), and a key diversification information ("Info") 216. In a conventional key derivation method (illustrated schematically by the left picture in FIG. 2A), blocks of various data (212, 214, 216) may be input into KDF 202 sequentially. For example, different blocks of the info 216 (e.g., 216-1, 216-2, and so on) may be input into the chaining function on consecutive iterations of the hash algorithm. Because each iteration may involve blocks of data (e.g., block 216-1) capable of having many values (e.g., a block that is 16-bits long may have $2^{16}$=65,536 different values), a DPA-attacker may take advantage of the fact that the same input key 212 may be processed with many different blocks of the Info 216 (while many different keys are generated from the same input key 212 and different Info 216). The attacker may use the hardware signals (emanations) produced by the processor(s)/memory to determine secret data, such as the value of the input key 212 and, as a consequence, receive access to various secret output keys 222 generated by the KDF 202.

To prevent a DPA attacker from gaining access to secret data, the Info 216 may be expanded, as illustrated schematically by the right picture of FIG. 2A. The expanded Info 250 may have the same information load as the unexpanded info 216, but may occupy a larger size (e.g., a larger number of bits of data). Because each block of the expanded Info 250 carries a reduced information load, the number of possible values that each of the blocks 250-1, 250-2 . . . 250-N may take may be significantly reduced compared with the number of values that each of the unexpanded blocks 216-1, 216-1, . . . can have. For example, if block 250-1 is deterministically expanded from 4 bits of block 216-1, the total number of various possible values of block 250-1 is $2^4$=16. As a result, the same input key 212 may only be processed (e.g., during a first chaining iteration of KDF 202) with only 16 different values of the block 250-1. Accordingly, the number of different signals that may be detected by the DPA attacker is reduced significantly, making it more difficult for the attacker to collect statistics sufficient to extract the value of the input key 212. Similarly, when the second (third, fourth, etc.) block 250-2 (250-3, 250-4, etc.) of the expanded Info 250 is input into KDF 202, the chaining value of the hash algorithm is processed with only a limited range of possible values of the block 250-2.

Figure 2B:
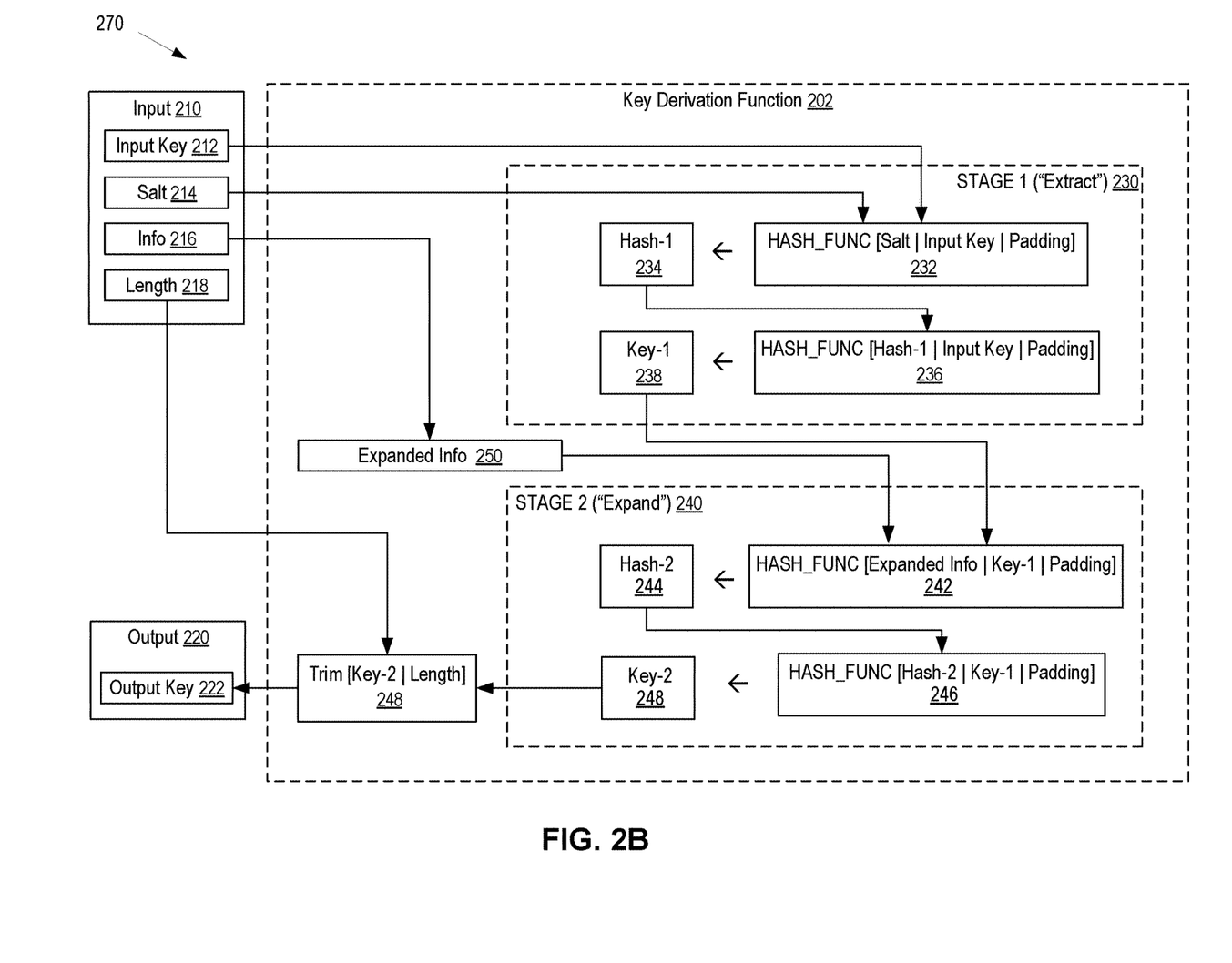
FIG. 2B illustrates exemplary operations of a key derivation function that implement expansion of diversification information to increase homogeneity of input values and enhance protection against side-channel attacks, in accordance with one or more aspects of the present disclosure.

In some implementations, consecutive strings of bits of the Info 216 may be expanded into consecutive blocks of the expanded Info 250. In other implementations, the expansion of the strings of Info 216 may not follow a consecutive order. For example, the first string of two (four, etc.) bits of Info 216 may be expanded into block 250-4, the second string of bits of Info 216 may be expanded into the last block 250-N, the third string of bits of Info 216 may be expanded into block 250-1, and so on. In general, any deterministic mapping may be used that maps m bits of Info 216 to Mbits of expanded Info 250. Such expansion may include various operations, such as a copy operation—where a certain bit (or a number of bits, whether sequential or not) are replicated a specific number of times into pre-determined positions. The expansion may further include a padding operation—where specific values (e.g., zeros or ones) are inserted into pre-determined positions. The expansion may further include any logic operations performed on the bits of the Info 250. Specifically, transformation of Info 216 into expanded Info 250 may involve a mapping of the form, $$y_k = f_k[x_1, x_2, x_3, \ldots x_m], 1 \le k \le M,$$

where m is the number of bits of Info 216, Mis the number of bits of expanded Info 250, $x_j$ is the value of the j-th bit of Info 216, $y_k$ is the value of the k-th bit of expanded Info 250 and $f_k$ is a function that defines the value $y_k$ based on the set of values $\{x_j\}$. In some implementations, the functions $f_k$ may be selected so that the information contained in the Info 216 is spread out within the expanded Info 250 uniformly (to avoid situation where padding is overrepresented in one region of the expanded Info 250 whereas actual data of the Info 216 is overrepresented within another region of the expanded Info 250). FIG. 2B illustrates exemplary operations 270 of a key derivation function that implement expansion of diversification information to increase homogeneity of input values and enhance protection against side-channel attacks, in accordance with one or more aspects of the present disclosure. The exemplary operation 270 may be performed by one or more computer systems 102, in some implementations. The key derivation function 202 may be an HKDF, in one implementation. An input 210 into the key derivation function 202 may include an input key 212 and an output 220 of the derivation function 202 may include an output key 222. The input key 210 may be an initial keying material, a cryptographically weak key, a cryptographically strong key, a base key to seed a family of keys, a key that is derived by a key derivation function, which may be the same or different from the key derivation function 202. The input 210 into the key derivation function 202 may further include (optionally) a salt 214 and a diversification Info 216. In some implementations, the salt 214 may remain the same for multiple input keys 212 (e.g., when a family of keys is being generated) whereas Info 216 may vary with the input key 212, depending on a context and/or an intended function of the key being generated. For example, Info 216 may distinguish between data encryption keys, authentication keys, digital signature keys, key transport keys, root keys, master keys, and so on. Furthermore, Info 216 may distinguish between various clients, applications, etc. The input 210 may further include a required length 218 of the output key 222. The length 218 may depend on an encryption algorithm in which the output key 222 is to be used. For example, 128- and 256-bit keys may be used with Wired Equivalent Privacy (WEP), Advanced Encryption Standard (AES), and Data Encryption Standard (DES) algorithm whereas 1,024 to 4,096 bit keys may be used with RSA algorithms.

The key derivation function 202, illustrated in FIG. 2B, may include two stages, with each stage adding to a strength of the derived cryptographic key. One or more of the stages may be HMAC-based. In some implementations, key derivation functions with a single stage may be used. In other implementations, key derivation functions with more than two stages may be used. In the exemplary implementation shown in FIG. 2B, a STAGE 1 ("Extract") 230 may use two instances (e.g., 232 and 236) of a hash function, but in other implementations, two, three, four, or more instances of a hash function may be used. In some implementations, the hash functions used in the second (or third) instance may be different from the hash function used in the first instance. For conciseness, both instances of the hash function 232 and 236 in FIG. 2B are shown to deploy the same hash function HASH_FUNC [Message] operating on an arbitrary input "Message."

The hash function HASH_FUNC [Message] may be a secure hash algorithms (SHA) that may be used in conjunction with various encryption standards (e.g., WEP, AES, DES, RSA, and so on). SHA may belong to one of the families SHA-0, SHA-1, SHA-2, SHA-3, etc. The hash function HASH [Message] may operate on fixed-size blocks, such as 512-bit blocks (SHA-0 and SHA-1 and SHA-224/SHA-256 of the SHA-2 family), 1024-bit blocks (SHA-384 and SHA-512 of the SHA-2 family), and SHA-3 algorithm blocks may range from 576 to 1152 bits. The Message of the first instance 232 of HASH_FUNC may be the input key 212 with the salt 214 concatenated to it (on the left or right of the input key 212) with additional (optional) padding performed to increase the size of the ensuing Message. Padding may include, for example, concatenation of zeros (or ones) to the Message. Application of the hash function to Message="Salt|Input Key|Padding" may result in an intermediate Hash-1 value 234. To obtain Hash-1, the hash function may perform a plurality of operations, such as AND, XOR, ROT, ADD, OR, NOT, SHR, and the like. Some of the plurality of operations (e.g., ADD operations) may be modular arithmetic operations. A hash function may be any combination of these (or additional) operations, such that any two close input messages nonetheless result in significantly different hashes (message digests) and that an inverse operations (determining the input Message based on the hash output) is a prohibitively complicated computational operation. A hash function may be designed to minimize the risk that two different messages result in the same hashes. As may be recognized by a person skilled in the art, there are virtually unlimited possibilities to select among the existing hashing algorithms or design new hashing algorithms.

The output of the first instance of the hash function 232, Hash-1 value 234, may be used as (a part of) the input message into the second instance of the hash function 236. The message into the second instance of the hash function 236 may (optionally) include additional strings of data, e.g., the input key 212 and padding. These additional strings may be concatenated to the Hash-1. In some implementations, the input key 212 may be concatenated differently that in the first instance of hash function 232. For example, if the input key 212 is concatenated to the left (right) of the salt 214 in the first instance of hash function 232, the input key 212 may be concatenated to the right (left) of the Hash-1 value 234 in the second instance of hash function 236. In some implementations, the input key 212 may be on the same side of salt 214 and Hash-1 value 234 in the corresponding instances of the hash function. In some implementations, the salt 214 and the input key 212 (and, similarly, Hash-1 value 234 and the input key 212) may be concatenated immediately next to each other whereas in other implementations they may be concatenated with a string of padding in between.

The second instance of the hash function 236 may generate another digest (hash), such as a Key-1 238, which may be an intermediate key of the key derivation operations 270. The Key-1 238 may be an output of STAGE 1 230 of the key derivation function 202 and may further serve as an input into the STAGE 2 ("Expand") 240 to produce an even stronger output cryptographic key than the Key-1 238. In the exemplary implementation shown in FIG. 2B, STAGE 2 240 may, similarly to STAGE 1 230, use two instances (e.g., 242 and 246) of a hash function, although in other implementations, two, three, four, or more instances of a hash function may be used in STAGE 2 240. In some implementations, STAGE 2 may be a HMAC-based stage. In some implementations, the hash function(s) used in STAGE 2 may differ from the hash function(s) used in STAGE 1, although in other implementations the same hash function may be used throughout the two stages. For conciseness, both instances 242 and 246 in FIG. 2B are shown to use the same hash function HASH_FUNC [Message] (which is also the same as the hash function used in the instances 232 and 236) even though this may not need be the case in all implementations. Everything stated above with respect to the possible types of hash function(s) (and the associated encryption standards and algorithms) of STAGE 1 may equally apply to the hash function(s) HASH_FUNC [Message] deployed in STAGE 2.

The Message input into the first instance 242 of HASH_FUNC of STAGE 2 may include the Key-1 238 and an Expanded Info 250. In one implementation, to obtain the Expanded Info 250, the expansion module 152 may access the Info 216 of the input 210 and map the Info onto a longer string of bits according to some deterministic procedure. For example, in one implementation, the expansion module 152 may take each l-bit interval of the Info 216 and replicate it a number of times until the new interval occupies l×m bits with m copies of the original interval. The new interval may have the size of one (or two, or more) block(s). For example, each l=2 bit interval may be expanded to occupy 256 bits (or 512 bits). More specifically, a string of the Info 216, e.g. a two-bit string having value 01, may be expanded, e.g., 01010101 . . . . In some implementations, the expansion may be performed until the expanded string occupies a 512-bit block or a 1024-bit block. In some implementations, the expansion may be performed by padding the initial string 01 until the expanded string 01000000 . . . occupies an entire block. In some implementations, an expansion function may be used, with a j-th string of the Info 216 expanded (in some deterministic manner) into a j-th block of the Expanded Info 250:

$$\text{Expanded Info(Block } j) \leftarrow \text{FUNC\_EXP}[\text{Info(String } j)]$$

In some implementations, different blocks may have the same or different size being obtained from strings having the same or different lengths.

The number of different values that a block of the Expanded Info 250 can take may be the same as the number of different values of a shorter string of the Info 216. In some implementations, any function deterministically mapping a shorter string of the Info 216 onto a longer block of the Expanded Info 250 may be used. In some implementations, the expansion function may be an injective function, so that no two values of a string of the Info 216 are mapped onto the same value of a block of the Expanded Info 250 (so that the information content of the string is identical to the information content of the expanded block). In some implementations, a size of the block output of the expansion function may be the same as the size of a block used in iterations of the key derivation function. In other implementations, a size of the block output of the expansion function may be different from the size of the block used in iterations of the key derivation function.

This expansion process may be performed for each l-bit string of the Info 216. For example, if the Info 216 has 32 bits, the Expanded Info 250 may have the length equal to 16 blocks. In some implementations, to ensure a small number of possible values of blocks of the Expanded Info 250, the length of a string of the Info 216 may not exceed l=8. For the same reason, in some implementations, a block of the Expanded Info 250 may be at least sixteen times the length of a string from which the respective block is derived. As a result of the expansion (Info 216→Expanded Info 250), the information content of the Expanded Info 250 may be the same as the content of the original Info 216.

The Expanded Info 250 may be used as (a part of) an input into the first instance 242 of the hash function. In the implementation depicted in FIG. 2B, the Key-1 238 with an additional padding including a string of zeros (or ones) may be concatenated to (to the left or right of) the Expanded Info 250. Application of the hash function to Message="Expanded Info|Input Key|Padding" may result in an intermediate Hash-2 value 244.

The Hash-2 value 244 may be used as (a part of) the input message into the fourth instance of hash function 246. The message into the fourth instance of hash function 246 may additionally include Key-1 238 and padding, which may be concatenated to Hash-2 244 in a manner described above.

The fourth instance of the hash function 246 may generate a Key-2 248, which may be an output of STAGE 2 240 of the key derivation function 202. The Key-2 248 may be trimmed to a required length 218 at block 260 to produce the output key 222. If the required length 218 of the output key is N bits, the Trim operation may select the first N bits of the Key-2, the last N bits of the Key-2, or any other N bits according to a pre-determined selection scheme (e.g., every odd/even bit starting from the most/least significant bit, and so on).

Figure 3:
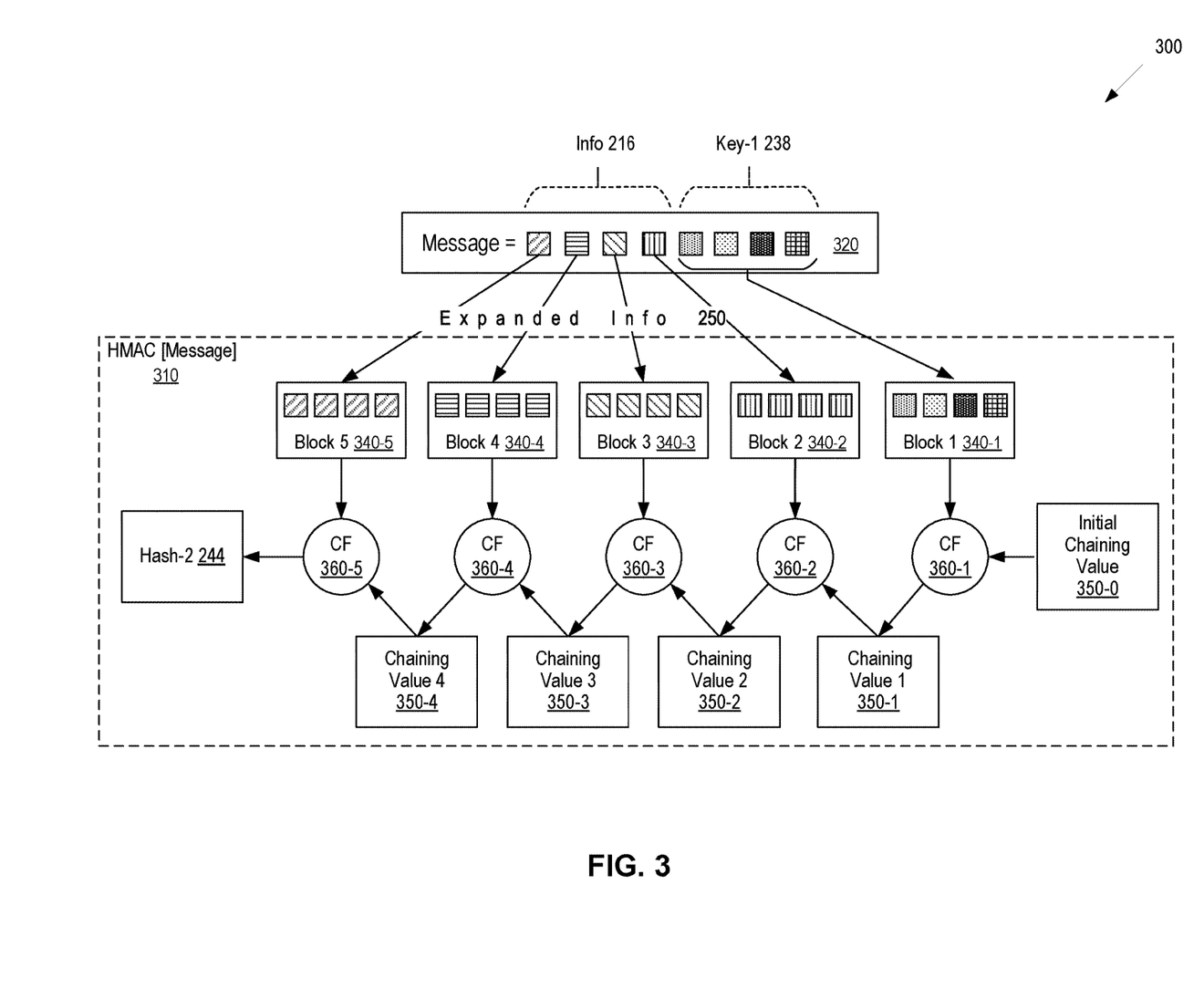
FIG. 3 illustrates an exemplary implementation of processing of the expanded diversification information by a hash function to increase homogeneity of input values and enhance protection against side-channel attacks, in accordance with one or more aspects of the present disclosure.

FIG. 3 illustrates an exemplary implementation 300 of processing of the expanded diversification information by a hash function (e.g., as part of the HMAC 310) to increase homogeneity of input values and enhance protection against side-channel attacks, in accordance with one or more aspects of the present disclosure. The exemplary implementation 300 may be performed by one or more computer systems 102, in some cases. In the context of FIG. 2B, FIG. 3 illustrates an exemplary execution of the third instance of the hash function 242 of the operations 270 in which the input includes the Expanded Info. In other cases, the exemplary implementation 300 may be performed during execution of the first instance of the hash function 232 (with the salt 214 or/and the input key 212 expanded), the second instance of the hash function 236 (with Hash-1 value 234 or/and the input key 212 expanded), or the fourth instance of the hash function 246 (with Hash-2 value 244 or/and Key-2 248 expanded). In those implementations where the key derivation function 202 deploys more than four instances of a hash function, the exemplary implementation 300 may be performed during execution of any instance of the hash function(s). In some implementation, more than one instance of the hash function(s) may be executed with an input messages expanded. For example, the salt 214 may be expanded during (or prior to) execution of the first instance of the hash function 232 and the Info 216 may be expanded during (or prior to) execution of the third instance of the hash function 242.

A conventional input message 320 into the third instance of the hash function would have included the Info 216 and the Key-1 238. As shown in FIG. 3, the Info 216 and the Key-1 238 may be concatenated together (and further concatenated to padding; not displayed for conciseness). Various strings of the Info 216 and the Key-1 are indicated by squares in the message 320, the squares having different shadings. In implementations of the present disclosure, the message 320 may be expanded (e.g., by the expansion module 152), as described above. For example, each string of the Info 216 (a shaded square) may be expanded into a part of a block, a full block (as depicted in FIG. 3), or more than one block (e.g., two or more blocks). The blocks 340 with the expanded message may be processed by a hash function (of a code, such as HMAC, having multiple instances of a hash function), in one implementation.

The hash function may process blocks 340 in multiple iterations of the hashing algorithm, with a compression function 360 used in each iteration to compute a chaining value to link successive iterations. In one exemplary implementation depicted in FIG. 3, the key derivation module 150 may assign some initial chaining value 350-0, which may be some constant that is the same across at least some instances of the hash function. This constant may be taken from the specification of the hashing algorithm, in some implementations. The initial chaining value 350-0 may be input into the compression function (CF) 360-1 together with the Block 1 340-1 to generate a first chaining value 350-1. The generated first chaining value 350-1 may then be used as the next input into the compression function 360-2 together with block 2 340-2 to generate a second chaining value 350-2 and so on, according to:

$$\text{Chaining\_Value}(j) = \text{CF}[\text{Chaining Value}(j-1), \text{Block}(j)].$$

The compression function CF may be a pseudorandom function. In some implementations, this pseudorandom function may be based on Goldreich-Goldwasser-Micali Construction. Of the two inputs Chaining_Value (j−1) and Block (j) into the pseudorandom function CF, any one may be treated as a "key" (e.g., the chaining value) while the other one (e.g., the block) is treated as "data."

The chaining value obtained after processing of the last block (e.g., Block 340-5) is the output hash value, e.g., Hash-2 value 244. In the implementation depicted in FIG. 3, the total of five blocks 340 are being processed: Block 1 (340-1) with the Key-1 238 (and, possibly, some padding) and Blocks 2-5 (340 2-5) with the Expanded Info 250. In other implementations, a different number of blocks (more or less than five) may be processed instead. Some of the additional blocks 340 that contain only padding may also be included. In the implementation depicted in FIG. 3, the block(s) with the key (e.g, Key-1 238) are processed first, whereas the blocks with the Expanded Info 250 are processed later. In other implementations, the block(s) with the key may be processed last while the blocks with the Expanded Info 250 (and/or padding) are processed first. In some implementations, the block(s) with the key may be processed in the middle with some of the blocks with the Expanded Info 250 (and/or padding) processed before the key and the remaining blocks with the Expanded Info 250 (and/or padding) processed after the key.

The operations illustrated in FIGS. 2 and 3 have an advantage, compared with conventional hashing operations of a key derivation function, that the compression function CF operates on data blocks (blocks 340) that, despite their significant length, have a limited number of values (by virtue of these blocks being expanded from smaller strings of bits of the Info 216). Since the same amount of information is spread across a larger number of iterations, diffusion effects make it significantly harder for a side-channel attacker to recover secret information using a DPA analysis.

The described implementations may be capable of achieving improved cryptographic security on hardware security modules (HSMs) without an undesirable performance penalty. In the context of HSMs, the described implementations that use a key derivation function are expected to have an advantage over an AES algorithm. For example, if the input key 212 is processed iteratively with consecutive blocks of the Expanded Info 250, the resulting intermediate keys key(j+1)=AES[key(j),block(j)] may be treated by an HSM in the same way the HSM treats a final key and stored in the HSM's non-volatile memory. With a large number of iterations to performed on all the blocks of the Expanded Info 250, using AES function for key generation may result in a very inefficient utilisation of HSM's memory resources. In contrast, the HSM performing key generation with a key derivation function that uses compression function iteration, does not treat intermediate chaining values as cryptographic key and, correspondingly, stores them in a volatile memory. As a result, the non-volatile memory is not over-utilized.

Figure 4:
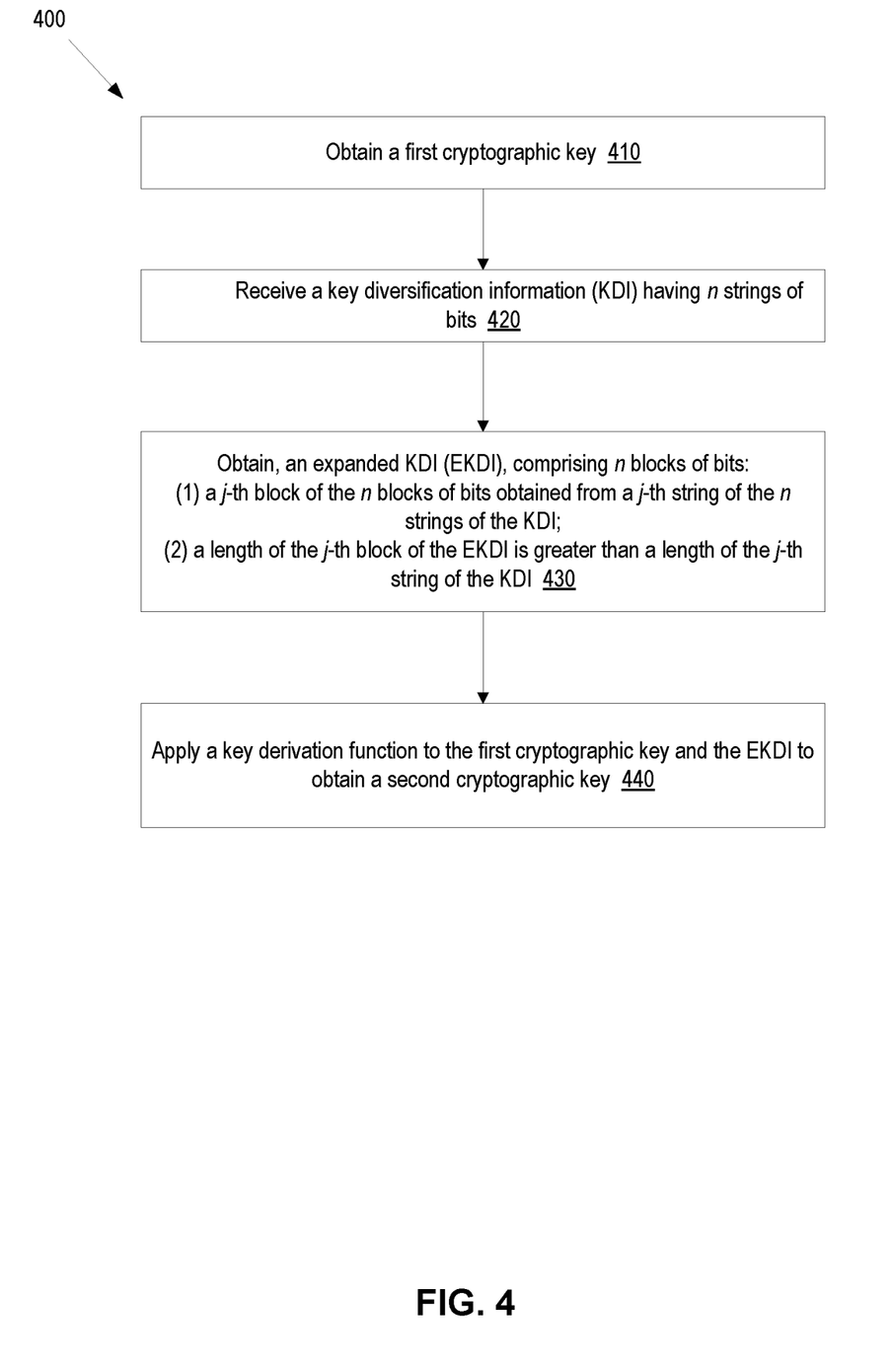
FIG. 4 depicts a flow diagram of an illustrative example of method to generate cryptographic keys using expanded diversification information to increase homogeneity of input values and enhance protection against side-channel attacks, in accordance with one or more aspects of the present disclosure.
Figure 5:
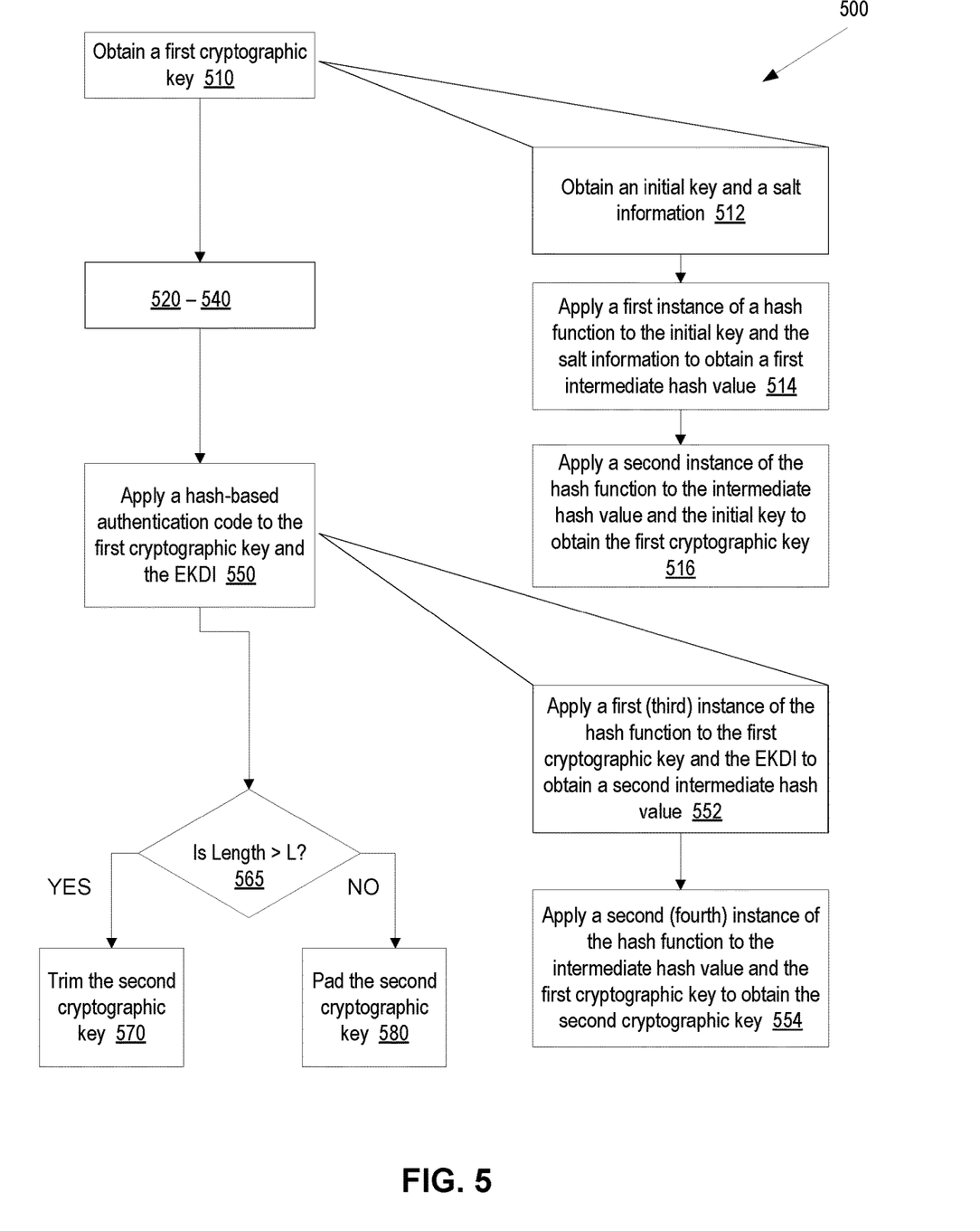
FIG. 5 depicts a flow diagram of another illustrative example of method to generate cryptographic keys using expanded diversification information to increase homogeneity of input values and enhance protection against side-channel attacks, in accordance with one or more aspects of the present disclosure.

FIGS. 4 and 5 are flow diagrams illustrating exemplary methods 400 and 500 that use expanded diversification information to enhance protection cryptographic keys from side-channel attacks, in accordance with some implementations of the present disclosure. Each of methods 400 and 500 may be performed by processing logic that may comprise hardware (e.g., circuitry, dedicated logic, programmable logic, microcode, etc.), software (such as instructions run on a processing device), firmware, or a combination thereof. In one implementation, methods 400 and 500 may be performed by a processing device (e.g. a computer system 600 of FIG. 6) of an example computer system 102, as described in connection with FIG. 1. In certain implementations, methods 400 and 500 may be performed by a single processing thread. Alternatively, methods 400 and 500 may be performed by two or more processing threads, each thread executing one or more individual functions, routines, subroutines, or operations of the method. In an illustrative example, the processing threads implementing methods 400 and 500 may be synchronized (e.g., using semaphores, critical sections, and/or other thread synchronization mechanisms). Alternatively, the processing threads implementing methods 400 and 500 may be executed asynchronously with respect to each other. Therefore, while FIGS. 4 and 5 and the associated descriptions list the operations of methods 400 and 500 in certain order, various implementations of the methods may perform at least some of the described operations in parallel and/or in arbitrary selected orders.

FIG. 4 depicts a flow diagram of an illustrative example of method 400 to generate cryptographic keys using expanded diversification information to increase homogeneity of input values and enhance protection against side-channel attacks, in accordance with one or more aspects of the present disclosure. Various operations of the method 400 may be performed in a different order compared to the order shown in FIG. 4. Some operations may be performed concurrently with other operations. Some operations may be optional.

The method 400 may be implemented by a processor/ALU performing a cryptographic operation, which may output a public key or a private key, a key for an asymmetric cryptographic algorithm, and so on. At operation 410, the processing device performing method 400 may obtaining a first cryptographic key. The first cryptographic key may be a base key used to generate a family of cryptographic keys, an initial keying material, or an intermediate key obtained from the initial keying material (or a base key) by one or more cryptographic operations, such as operations involving hash functions. The first cryptographic key may be a (cryptographically) strong key or weak key, depending on an implementation.

At operation 420, the processing device may receive a key diversification information (KDI). The KDI may be prepared based on the purpose of the output key, the person or application intended as the user of the output key and so on. The KDI may include n string of bits. The method 400 may continue with obtaining, by a processing device, an expanded key diversification information (EKDI), comprising n blocks of bits, wherein a j-th block of the n blocks of bits is obtained from a j-th string of the n strings of the KDI and a length of the j-th block of the EKDI is greater than a length of the j-th string of the KDI (operation 430). In some implementations, a length of the first string of bits on the n strings of bits may be one bit, two bits, three bits, four bits, and so on. In some implementations, the length of the first string of bits may be up to eight bits. In some implementations, the length of the j-th string may be a divisor of the length of the j-th block (e.g. a divisor of 256, 512, 1028 bits, etc.) of a hash function used during other operations of method 400 (e.g., used during operation 440).

In some implementations, the EKDI may further include a plurality of copies of a second string of the n strings of bits of the KDI. The second string of bits may have the same length as the first string of bits (e.g., two bits). Alternatively, the second string of bits may have a length that is different from the length of the first string of bits. For example, the length of the second string of bits may be four bits. The second string of bits may be copied the same number of times as the first interval or a different number of times than the first string of bits. For example, the second string of four bits may be copied 128 times (so that the corresponding part of the EKDI has the length of two 256-bit blocks) or 64 times (four bits expanded into a single 256-bit block of the EKDI). In some implementations, some of the blocks of the KDI may remain unexpanded, whereas in other implementations, every string of the KDI may be expanded.

At operation 440, the processing device may apply a key derivation function to the first cryptographic key and the EKDI to obtain a second cryptographic key. The key derivation function may use a hash-based authentication code, such as HMAC or any other hash-based code. The hash-based code may include two instances of the hash function, as may be a situation where HMAC is being used. The hash function may be based on the SHA-256 or SHA-512 algorithms. An output of each of the one or more instances of the hash function may be a fixed-length hash value (a digest of the input message). In some implementations, the hash-based authentication code may have only one instance of the hash function, whereas in other implementations, the hash-based authentication code may include three or more instances of the hash function (in some implementations, the hash functions used in various instances may be different from each other). In some implementations, an input into at least one of the instances of the hash function may include the EKDI.

In some implementations, applying the key derivation function function) may include applying a compression function to a chaining value and to a first block of the EKDI, wherein the chaining value may be derived from the first cryptographic key. For example, as illustrated in FIG. 3, the compression function 360-2 may be applied to the chaining value 350-1 derived from the first key 340-1 and the first block 340-2 of the Expanded Info 250. In some implementations, the compression function may be a pseudorandom function. In some implementations, e.g., involving NIST 800-108 counter-mode key derivation function, the key derivation function may include a plurality of iterations, wherein each iteration comprises inputting a counter variable into a pseudorandom function. In some implementations, e.g., involving NIST 800-108 feedback-mode key derivation function, the key derivation function may include a plurality of iterations, wherein each iteration comprises inputting an output of a previous iteration into a pseudorandom function.

The second cryptographic key obtained during the operation 440 may be a final output of the key derivation process exemplified by method 400, in some implementations. In other implementations, the second cryptographic key may be a non-final key that may subsequently be trimmed, padded, or further used as an input into one or more additional hash-based algorithms.

FIG. 5 depicts a flow diagram of another illustrative example of method 500 to generate cryptographic keys using expanded diversification information to increase homogeneity of input values and enhance protection against side-channel attacks, in accordance with one or more aspects of the present disclosure. Various operations of the method 500 may be performed in a different order compared to the order shown in FIG. 5. Some operations may be performed concurrently with other operations. Some operations may be optional. Some operations of method 500 may be similar to operations of method 400.

In some implementations of method 500, the operation 510 of obtaining the first cryptographic key may include a sub-operation 512 of obtaining an initial key and a salt information. The initial key may be a weak cryptographic key or a strong cryptographic key. The length of the initial key may be the same as or different from the length of the key output (e.g., the output key 222) by the method 500 (e.g., the length of the initial key may be shorter than the length of the output key). The initial key may be the same as the input key 212, and the salt information may be the same as the salt 214, in one implementation.

The method 500 may continue, with applying the hash-based authentication code to the initial key and the salt information to obtain the first cryptographic key. For example, in one implementation, the hash-based authentication code may be the "Extract" STAGE 1 230 algorithm depicted in FIG. 2B. The hash-based authentication code may include applying, as sub-operation 514, a first instance of the hash function to the initial key and the salt information to obtain a first intermediate hash value (e.g., Hash-1 value 234). The input into the first instance of the hash function may be a message including the salt information (and, optionally, padding) concatenated to the initial key. At sub-operation 416, the hash-based authentication code may include applying a second instance of the hash function to the intermediate hash value and the initial key to obtain the first cryptographic key. In some implementations, the first cryptographic key may be the same as Key-1 238 of FIG. 2B.

In some implementations of method 500, the operation 550 of applying the hash-based authentication code to the first cryptographic key and the EKDI may be the "Expand" STAGE 2 240 algorithm depicted in FIG. 2B and may include a first instance of STAGE 2 hash function (a third instance overall of the hash function, as illustrated in FIG. 4B) and a second instance of STAGE 2 hash function (a fourth instance overall). For example, at sub-operation 552, the processing device performing method 500 may apply the first (third) instance of the hash function to the first cryptographic key and the EKDI to obtain a second intermediate hash value (e.g., the Hash-2 value 244). The input into the first (third) instance of the hash function may be a message including the EKDI (and, optionally, padding) concatenated to the first cryptographic key. At sub-operation 554, the hash-based authentication code may include applying a second (fourth) instance of the hash function to the second intermediate hash value and the first cryptographic key to obtain the second cryptographic key. In some implementations, the second cryptographic key may be the same as Key-2 248 of FIG. 2B.

The method 500 may continue, at decision-making operation 565, by comparing the length ("Length") of the second cryptographic key with a pre-determined length L (which may be the same as the input length 218). If the processing device performing method 500 determines that the length of the second cryptographic key exceeds the pre-determined length, the processing device may adjust, at operation 570, the length of the second cryptographic key by trimming the second cryptographic key to the pre-determined length. For example, the processing device may remove the least (or the most) significant bits of the second cryptographic key, or apply any other procedure (e.g., deterministic procedure) of removing excess bits of the second cryptographic key. If the processing device performing method 500 determines that the length of the second cryptographic key is less than the pre-determined length, the processing device may, at operation 580, add padding to the second cryptographic key to the pre-determined length. For example, the processing device may concatenate padding (by adding zeros or ones) to the left or to the right of the second cryptographic key which was output by the operation 550, or apply any other procedure (e.g., a deterministic procedure) of inserting additional bits into the second cryptographic key.

Figure 6:
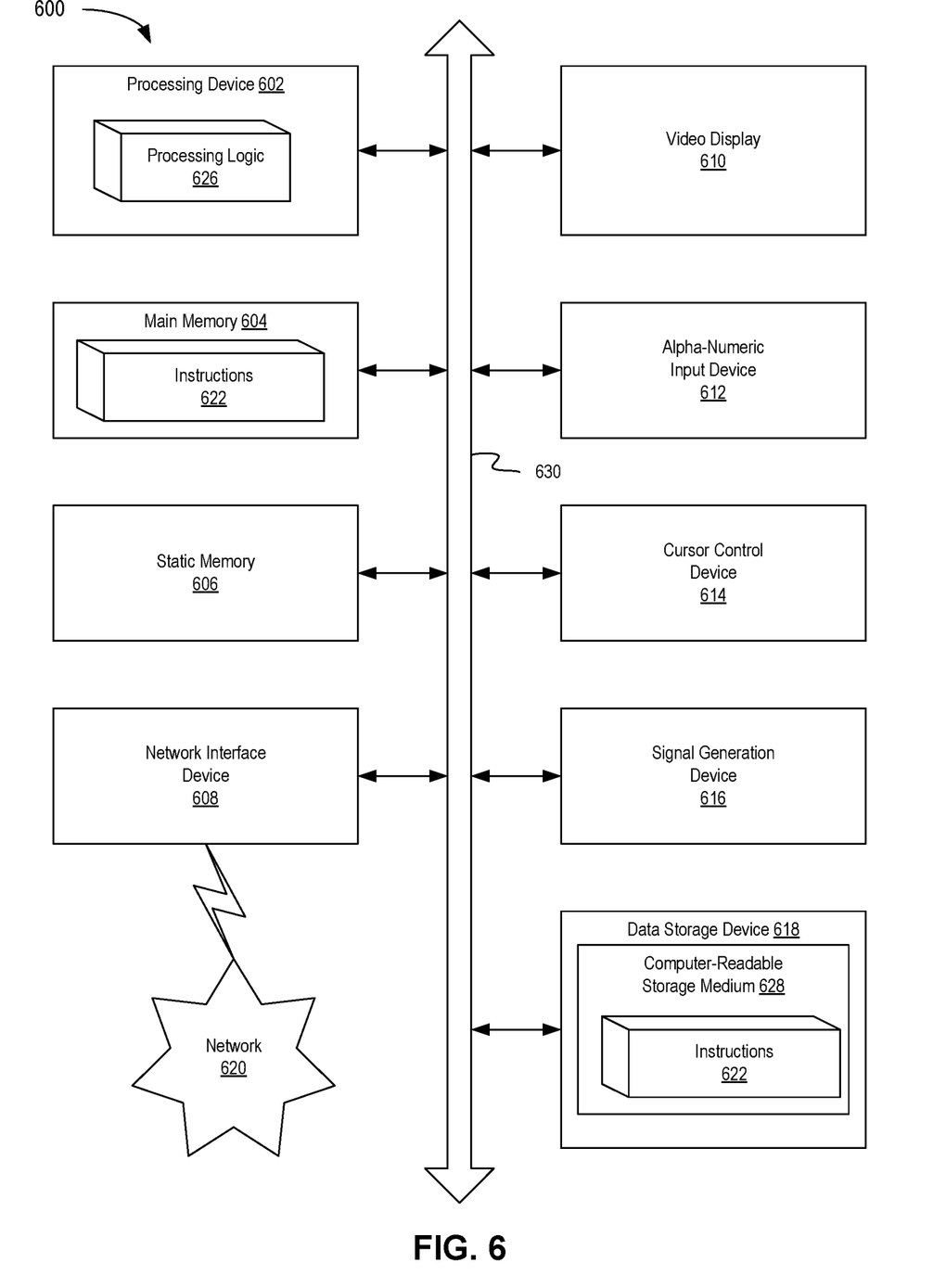
FIG. 6 depicts a block diagram of an example computer system operating in accordance with one or more aspects of the present disclosure.

FIG. 6 depicts a block diagram of an example computer system 600 operating in accordance with one or more aspects of the present disclosure. In various illustrative examples, computer system 600 may represent the computer system 102, illustrated in FIG. 1.

Example computer system 600 may be connected to other computer systems in a LAN, an intranet, an extranet, and/or the Internet. Computer system 600 may operate in the capacity of a server in a client-server network environment. Computer system 600 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 600 may include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FP GA), a digital signal processor (DSP), network processor, or the like. In accordance with one or more aspects of the present disclosure, processing device 602 may be configured to execute instructions implementing methods 400, 460, and/or 500 of generating cryptographic keys using expanded diversification information to increase homogeneity of input values and enhance protection against side-channel attacks.

Example computer system 600 may further comprise a network interface device 608, which may be communicatively coupled to a network 620. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 may include a computer-readable storage medium (or, more specifically, a non-transitory computer-readable storage medium) 628 on which is stored one or more sets of executable instructions 622. In accordance with one or more aspects of the present disclosure, executable instructions 622 may comprise executable instructions implementing methods 400, 460, and/or 500 of to generating cryptographic keys using expanded diversification information to increase homogeneity of input values and enhance protection against side-channel attacks.

Executable instructions 622 may also reside, completely or at least partially, within main memory 604 and/or within processing device 602 during execution thereof by example computer system 600, main memory 604 and processing device 602 also constituting computer-readable storage media. Executable instructions 622 may further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilising terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
obtaining a first cryptographic key;
receiving a key diversification information (KDI) comprising n strings of bits;
obtaining, by a processing device, an expanded key diversification information (EKDI), comprising n blocks of bits, wherein a j-th block of the n blocks of bits is obtained from a j-th string of the n strings of the KDI and a length of the j-th block of the EKDI is greater than a length of the j-th string of the KDI; and
applying, by the processing device, a key derivation function to the first cryptographic key and the EKDI to obtain a second cryptographic key.

2. The method of claim 1, wherein obtaining the EKDI comprises applying an expansion function to the KDI, wherein the expansion function deterministically derives the j-th block of the EKDI from the j-th string of the KDI.

3. The method of claim 1, wherein the EKDI comprises a plurality of copies of a first string of the n strings of bits of the KDI.

4. The method of claim 3, wherein a length of the first string of bits is not to exceed eight bits.

5. The method of claim 3, wherein a number of copies in the plurality of copies of the first interval of bits of the KDI is at least sixteen.

6. The method of claim 1, wherein the EKDI further comprises a plurality of copies of a second string of then strings of bits of the KDI.

7. The method of claim 1, wherein the j-th block of EKDI is obtained from the j-th string of the KDI by padding the j-th string of the KDI to the length of the j-th block of EKDI.

8. The method of claim 1, wherein applying the key derivation function comprises applying a compression function to a chaining value and to a first block of the EK DI, wherein the chaining value is derived from the first cryptographic key.

9. The method of claim 8, wherein the compression function is a pseudorandom function.

10. The method of claim 1, wherein the key derivation function comprises one or more instances of a hash function, wherein the hash function is to output a fixed-length hash value.

11. The method of claim 10, wherein the hash function is one of SHA-256 or SHA-512.

12. The method of claim 1, wherein the key derivation function is a hash-based key derivation function (HKDF).

13. The method of claim 1, wherein the key derivation function comprises a hash-based message authentication code (HMAC).

14. The method of claim 1, wherein the key derivation function comprises a plurality of iterations, wherein each iteration comprises inputting a counter variable into a pseudorandom function.

15. The method of claim 1, wherein the key derivation function comprises a plurality of iterations, wherein each iteration comprises inputting an output of a previous iteration into a pseudorandom function.

16. The method of claim 1, wherein obtaining the first cryptographic key comprises:
obtaining an initial key and a salt information; and
applying a hash-based authentication code to the initial key and the salt information to obtain the first cryptographic key.

17. The method of claim 1, wherein applying the key derivation function to the first cryptographic key and the EKDI comprises:
applying a first instance of a hash function to the first cryptographic key and the EKDI to obtain an intermediate hash value; and
applying a second instance of a hash function to the intermediate hash value and the first cryptographic key to obtain the second cryptographic key.

18. The method of claim 17, further comprising:
adjusting a length of the second cryptographic key to a pre-determined length by (1) trimming the second cryptographic key to the pre-determined length, if the length of the second cryptographic key exceeds the pre-determined length, or (2) padding the second cryptographic key to the pre-determined length, if the pre-determined length exceeds the length of the second cryptographic key.

19. A system to perform a cryptographic operation, the system comprising:
a memory device; and
a processor coupled to the memory device to:
obtain a first cryptographic key;
receive a key diversification information (KDI) comprising n strings of bits;
obtain an expanded key diversification information (EKDI), comprising n blocks of bits, wherein a j-th block of the n blocks of bits is obtained from a j-th string of the n strings of the KDI and a length of the j-th block of the EKDI is greater than a length of the j-th string of the KDI; and
apply a key derivation function to the first cryptographic key and the EKDI to obtain a second cryptographic key.

20. A non-transitory computer-readable medium to store instructions, which when executed by a processing device, cause the processing device to:
obtain a first cryptographic key;
receive a key diversification information (KDI) comprising n strings of bits;
obtain an expanded key diversification information (EKDI), comprising n blocks of bits, wherein a j-th block of the n blocks of bits is obtained from a j-th string of the n strings of the KDI and a length of the j-th block of the EKDI is greater than a length of the j-th string of the KDI; and apply a key derivation function to the first cryptographic key and the EKDI to obtain a second cryptographic key.

21. A method comprising:

obtaining a first cryptographic key;

receiving a key diversification information (KDI) comprising a first plurality of bits; obtaining, by a processing device, an expanded key diversification information (EKDI) comprising a second plurality of bits, wherein a number of bits in the second plurality of bits is greater than a number of bits in the first plurality of bits, and wherein a value of each bit of the second plurality of bits is deterministically obtained in view of values of the first plurality of bits; and applying, by the processing device, a key derivation function to the first cryptographic key and the EKDI to obtain a second cryptographic key.

22. The method of claim 21, wherein obtaining the EKDI comprises:

selecting a plurality of strings of the KDI; and generating multiple copies of each of the plurality of selected strings of the KDI.

23. The method of claim 22, wherein a number of copies of each of the plurality of selected strings of the KDI is at least fifteen.

24. The method of claim 21, wherein the key derivation function comprises at least one instance of a hash function, wherein the hash function is to output a fixed-length hash value.

25. The method of claim 21, wherein the key derivation function comprises a hash-based message authentication code (HMAC).

* * * * *